United States Patent
Cosimo et al.

(10) Patent No.: US 7,328,426 B2
(45) Date of Patent: Feb. 5, 2008

(54) EDITOR WITH COMMANDS FOR AUTOMATICALLY DISABLING AND ENABLING PROGRAM CODE PORTIONS

(75) Inventors: Vampo Cosimo, Rome (IT); Castino Raimondo, Rome (IT); Costantini Eliseba, Rome (IT)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/721,435

(22) Filed: Nov. 25, 2003

(65) Prior Publication Data

US 2005/0039164 A1 Feb. 17, 2005

(30) Foreign Application Priority Data

Aug. 13, 2003 (EP) .................. 03368078

(51) Int. Cl.
*G06F 9/44* (2006.01)
(52) U.S. Cl. ...................... 717/113; 717/110
(58) Field of Classification Search ................. 717/113
See application file for complete search history.

(56) References Cited

U.S. PATENT DOCUMENTS 6,792,595 B1 * 9/2004 Storistenau et al. ........ 717/110

2002/0184611 A1 * 12/2002 Endejan ....................... 717/113
2004/0003383 A1 * 1/2004 Chenier ....................... 717/154

FOREIGN PATENT DOCUMENTS

CA 2256931 * 6/2000

* cited by examiner

*Primary Examiner*—David Hudspeth
*Assistant Examiner*—Samuel G Neway
(74) *Attorney, Agent, or Firm*—Stephen J. Walder, Jr.; Jeffrey S. LaBaw

(57) ABSTRACT

A method (300) of editing program code is proposed. The program code consists of main instructions written in a high-level language. Typically, the program code further includes one or more sets of service instructions, which are not directly connected to a desired algorithm (such as tracing instructions for debugging purposes, performance measuring instructions, and the like). In the solution of the invention, each set of service instructions is enclosed (321-322) between a pair of predefined comments defining a starting tag and an ending tag. An editor of the program code is provided with commands for automatically disabling (341) the service instructions (converting them into corresponding comments); at the same time, the disabled instructions are condensed (340) on the monitor. Additional commands are available for automatically enabling (368) and restoring (367) the service instructions.

11 Claims, 5 Drawing Sheets

EDITOR WITH COMMANDS FOR AUTOMATICALLY DISABLING AND ENABLING PROGRAM CODE PORTIONS

TECHNICAL FIELD

The present invention relates to the data processing field, and more specifically to a method and a corresponding system for editing program code.

BACKGROUND ART

Several programming environments are known in the art for aiding software developers to write program code. For example, graphical tools are commonly used to help build graphical user interfaces that would normally take a large development effort; moreover, debuggers are used to find errors in a program (for example, allowing the developer to stop execution of the program at any point, in order to examine and change the values of variables).

Nevertheless, the task of editing the program code remains a complex and time-consuming activity. Particularly, this task is very difficult when a program written by a different person must be maintained or enhanced.

A technique commonly exploited by most developers to improve the readability of the program code is to insert comments intended to help other persons understand the corresponding logic. For example, a file storing the program starts with comments explaining its content; specific comments are used to describe any functional unit and complex operations or data structures.

Moreover, auxiliary instructions are often added to the main instructions defining a desired algorithm to be implemented. For example, those (service) instructions are used to trace an execution flow of the program for debugging purposes, to measure the performance of the program, and the like.

A drawback of the above-described scenario is that any information that is not strictly necessary to implement the desired algorithm adds complexity to the program code (for example, when displayed on a monitor of a computer). Particularly, a heavy use of the service instructions makes the program code very difficult to read. Likewise, program code that is over-commented becomes particularly irksome.

Moreover, the service instructions are continually inserted and removed during a development process. For example, the service instructions are used when necessary and are excluded converting them into comments otherwise; for this purpose, a corresponding special symbol is typically inserted or removed at the beginning of each service instruction. However, this process of manually disabling and enabling again the service instructions is time consuming and prone to errors. As a consequence, the (disabled) service instructions very often remain in the program even when they are not necessary any longer; this causes an unnecessary increase of the memory space occupied by the program.

SUMMARY OF THE INVENTION

It is an object of the present invention to facilitate the editing of program code.

It is another object of the present invention to allow disabling portions of the program code automatically.

It is yet another object of the present invention to avoid the errors involved by the manual insertion and removal of instructions.

The accomplishment of these and other related objects is achieved by a method of editing program code on a data processing system, the program code being suitable for subsequent processing, wherein the method includes the steps of defining at least one portion of the program code, selecting at least one defined portion, and automatically disabling the at least one selected portion, the at least one disabled portion being excluded from the subsequent processing.

Moreover, the present invention also provides a computer program for performing the method and a product storing the program.

A corresponding system for editing program code is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
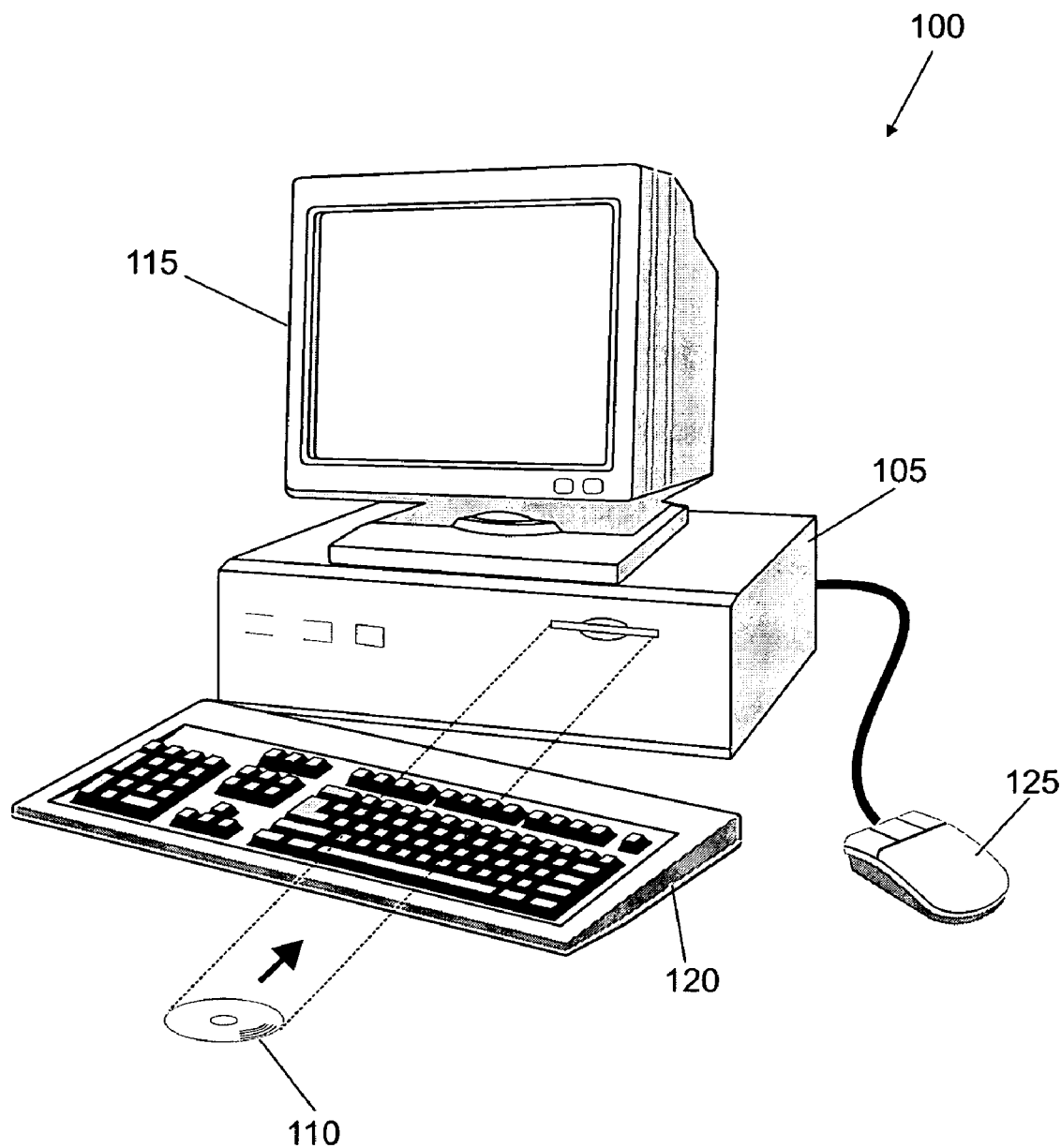
FIG. 1 is a pictorial representation of a computer in which the method of the invention is applicable.

With reference in particular to FIG. 1, a Personal Computer (PC) 100 is shown. The computer 100 consists of a central unit 105, which houses the electronic circuits controlling its operation (such as a microprocessor and a working memory), in addition to a hard-disk and a driver for CD-ROMs 110. Output information is displayed on a monitor 115 (connected to the central unit 105 in a conventional manner). The computer 100 further includes a keyboard 120 and a mouse 125, which are used to input information and/or commands.

Similar considerations apply if the computer has a different architecture, if the computer includes equivalent units, or more generally if the computer is replaced with any other data processing system.

Figure 2:
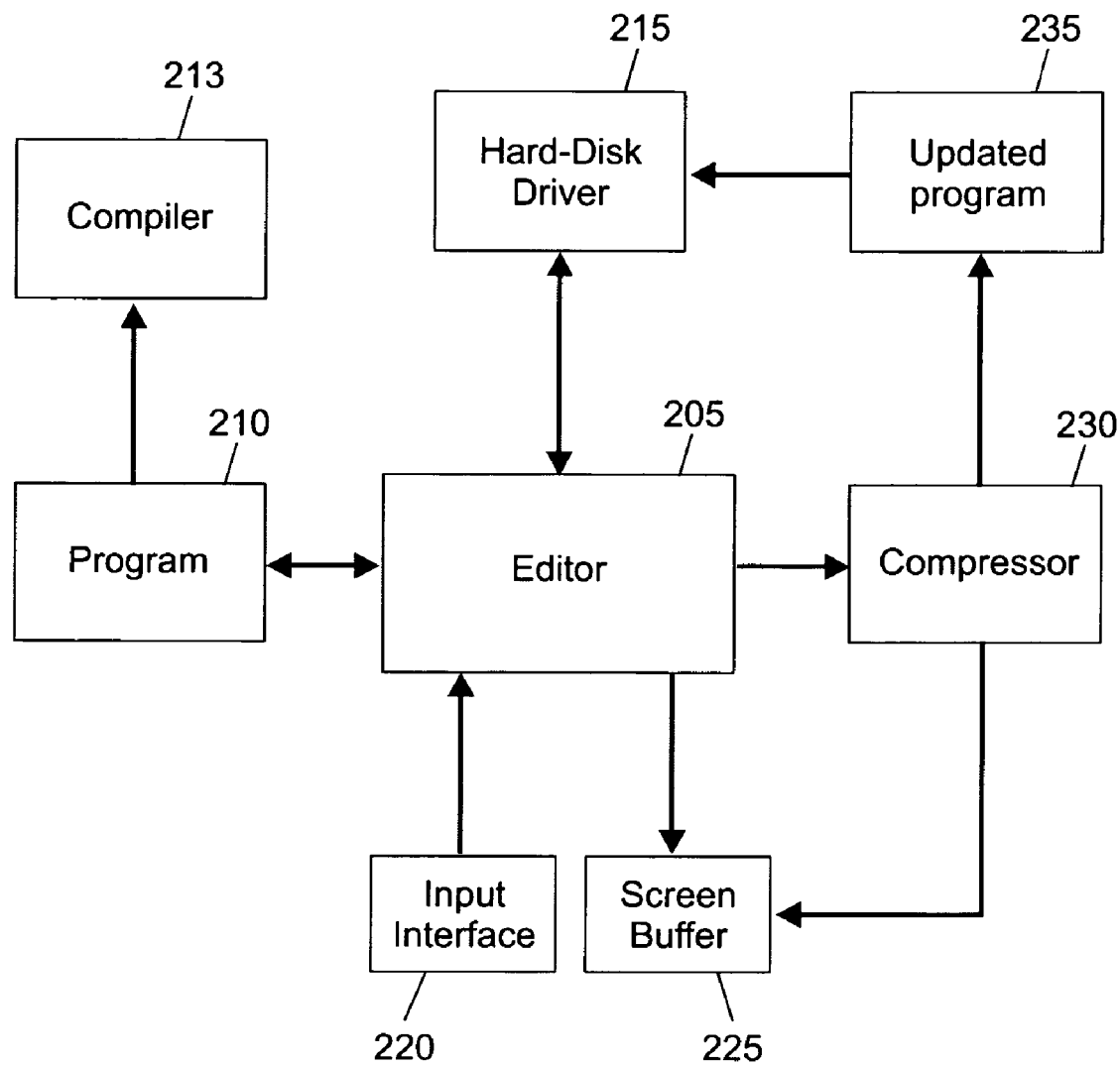
FIG. 2 shows the main software components used to implement the method.

Considering now FIG. 2, a partial content of the working memory of the computer is shown; the information (programs and data) is typically stored on the hard-disk and loaded (at least partially) into the working memory when the programs are running. The programs are initially installed onto the hard disk from CD-ROM.

An editor 205 is used to create, update, view, and perform other management functions on a computer program 210. The program 210 consists of statements in source code; each statement (defining a line of the program) is written in a human-readable, high-level programming language. The program 210 is then provided to a compiler 213, which converts the source code into corresponding object code for execution on the computer.

The core of the program 210 is formed by a sequence of functional instructions (for example, declarations and commands); the functional instructions define the operations implementing a desired algorithm to be executed by the program 210 (when compiled).

Sometimes, the program 210 further includes additional instructions that are not directly connected to the algorithm implemented by the functional instructions. For example, those service instructions are used to trace a flow of the program (during a debugging process), to measure its performance, and the like.

Typically, the program 210 also embeds comments (or remarks). The comments consist of text notes added to the (functional or service) instructions to provide explanatory information. Each comment begins with a special symbol (such as "//"), or it is enclosed between two symbols defining its starting and ending (such as <!-- and -->, respectively).

The editor 205 interfaces with a driver 215 for the hard-disk. The hard-disk driver 215 allows the editor 205 to load the program 210 into the working memory and to save the program 210 onto the hard-disk. An input interface 220 is used to enter information or commands with the keyboard and the mouse; the input interface 220 generates and sends corresponding messages to the editor 205. The editor 205 also controls a screen buffer 225 for the display of information on the monitor.

A compressor 230 is plugged into the editor 205. As described in detail in the following, the compressor 230 allows updating a visual representation of the program 210; for this purpose, the compressor 230 directly accesses the screen buffer 225. The compressor 230 can also be used to update a structure of the program 210; a resulting updated program 235 is supplied to the controller 215 for storing onto the hard-disk.

Similar considerations apply if different modules or functions are envisaged, or if the programs are provided on any other computer readable medium (such as one or more floppy-disks). However, the concepts of the present invention are also applicable when the editor is used to write equivalent program code (for example, in a low-level language such as the assembler), when the program is interpreted, when the comments are defined in a different way, and the like.

Figure 3A:
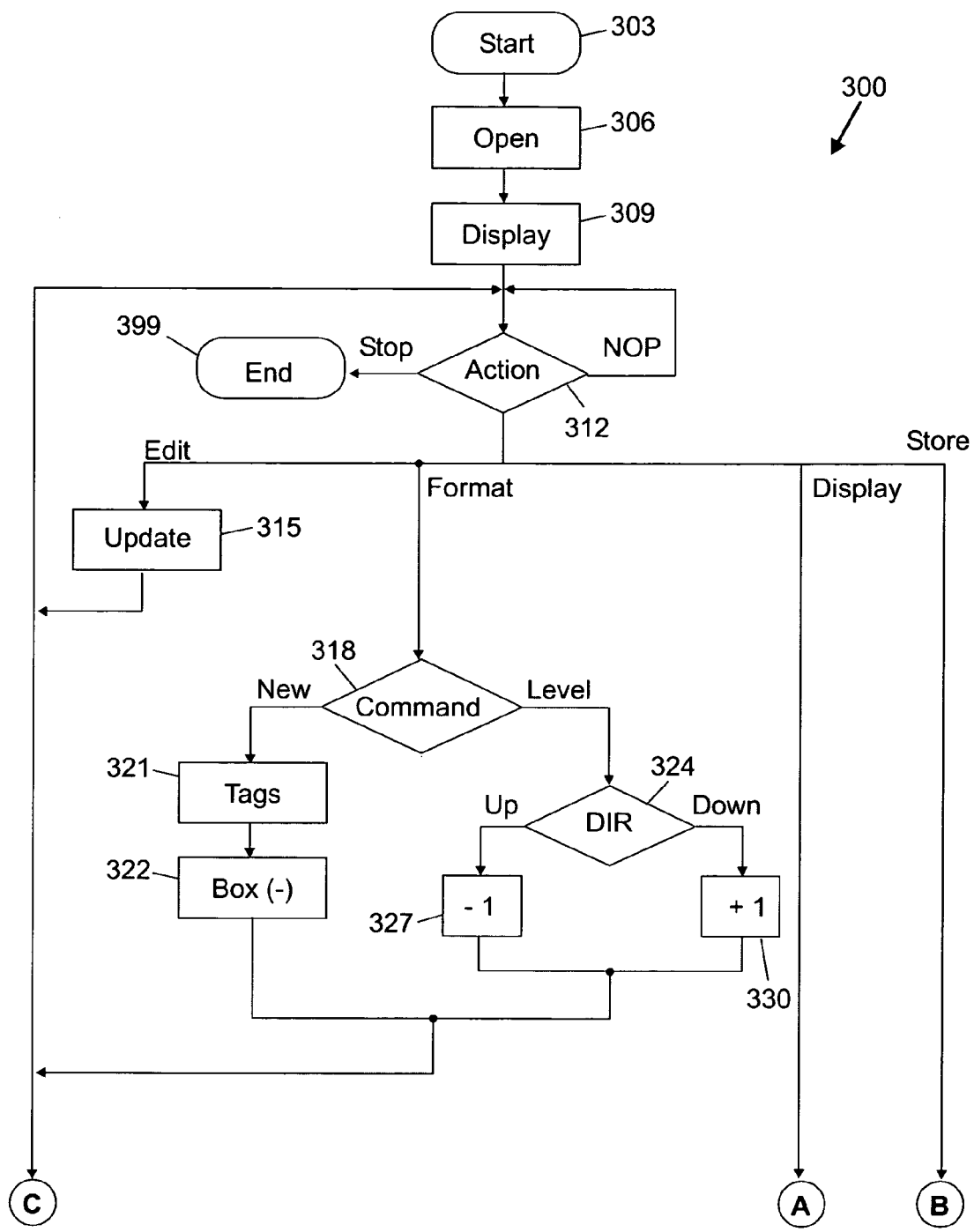
FIGS. 3a-3b illustrate a flow chart describing the logic of the method.
Figure 3B:
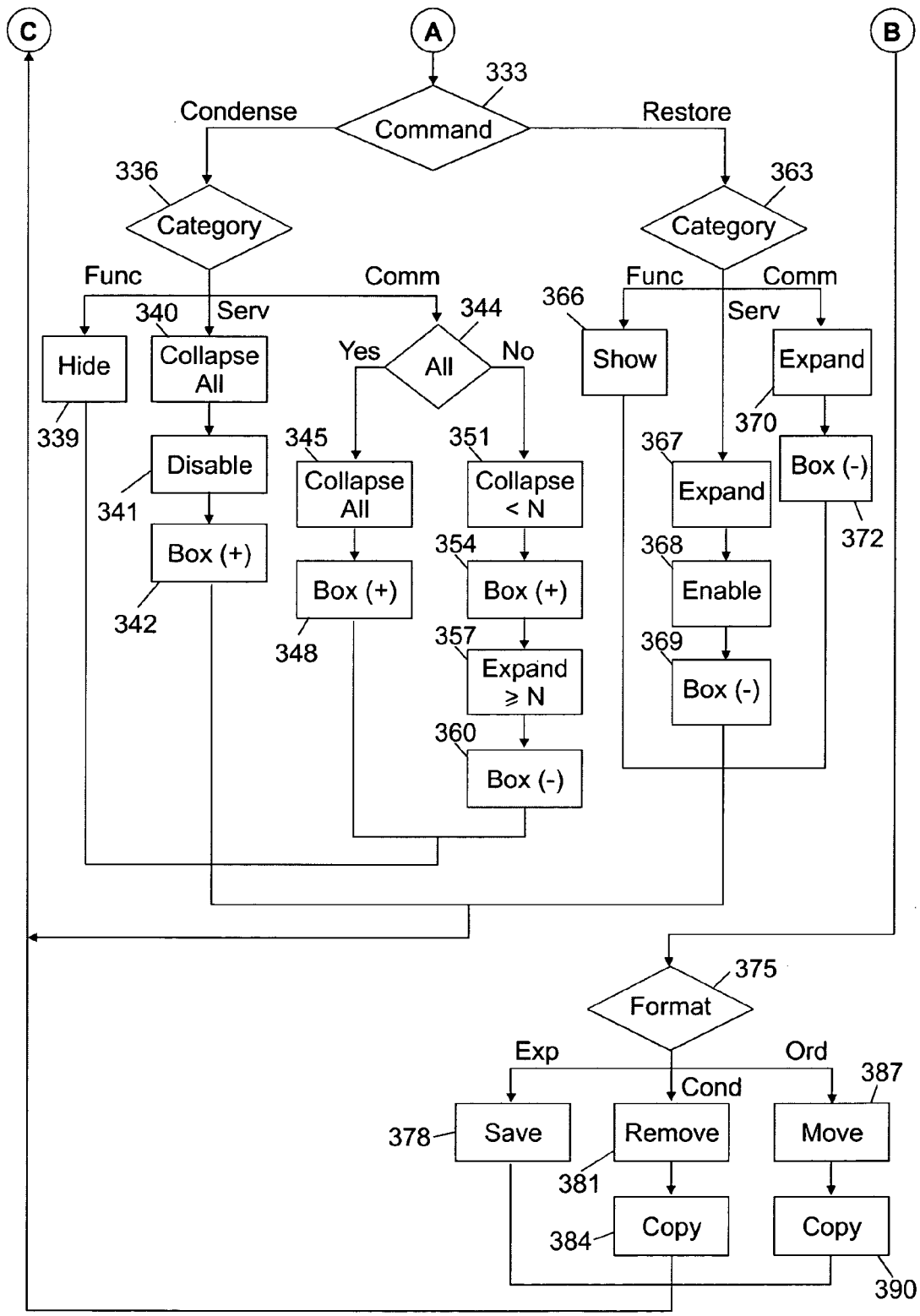

The logic of operation of the editor is illustrated in the flow chart of FIGS. 3a-3b. Whenever a software developer opens the editor, a method 300 is executed (it should be noted that the method is described with a flow chart for the sake of simplicity, although the editor typically operates according to the object-oriented paradigm). The method starts at block 303, and then passes to block 306 wherein a desired program is opened for editing; particularly, a new (empty) program is created or a pre-existing program is loaded from the hard-disk. The program (or a part thereof) is displayed at block 309 on the monitor of the computer.

The method then enters an idle loop at block 312, waiting for an action by the developer. The method exits the loop and branches in response to the occurrence of an event. Particularly, if the developer wishes to edit the program code the block 315 is executed, whereas if the developer enters a command the blocks 318-390 are executed; in both cases, the method returns to block 312 waiting for a new action of the developer. Conversely, if the developer closes the editor, the method ends at the final block 399.

Considering now block 315 (editing), the developer can modify any statement of the program that appears on the monitor. For example, the developer inserts new functional or service instructions, adds comments, deletes undesired statements, copies or moves blocks of statements to a different location, and the like.

With reference instead to blocks 318-390 (command), different operations are carried out according to the type of command entered by the developer. Particularly, the blocks 318-330 are executed in response to format commands, the blocks 333-372 are executed in response to display commands, and the blocks 375-390 are executed in response to store commands.

In detail, the format commands (blocks 318-330) are used to partition the program into multiple portions. Each program portion is assigned to a selected category; for example, a category is defined for the comments, and one or more categories are defined for the service instructions; all the other statements of the program are deemed functional instructions. Moreover, each program portion for the comments is associated with a selected level (for example, from 1 to 4).

For this purpose, whenever the developer enters a format command the method verifies its type at block 318. If the developer wishes to define a new program portion the blocks 321-322 are executed, whereas if the developer wishes to change the level of a selected program portion the blocks 324-330 are executed.

With reference now to block 321 (new program portion), two tags are inserted into the program; the tags define a starting and an ending, respectively, of the new program portion. Particularly, the starting tag consists of a comment including the symbol <S> for the service instructions or the symbol <Cn> for the comments (wherein "n" is a number from 1 to 4 identifying the level of the program portion); by default, the level of the new program portion for the comments is the same as the one of a preceding program portion of the same category (the level is set to 1 for the first new program portion for the comments). The ending tag consists of a further comment including the symbol <\S> (for the service instructions) or the symbol <\Cn> (for the comments). For example, a program portion for the comments of level 2 is enclosed between the following starting tag and ending tag:

//<C2>
//<\C2>

The method then descends into block 322, wherein a small box is added to the left of the starting tag; the box is filled with the sign "−".

Considering block 324 (change of level), a test is made to determine a direction of the requested change (downward or upward). If the level is to be lowered, the number denoting the level in the starting and ending tags (for the comments) is decreased by 1 at block 327; conversely, the number denoting the level in the starting and ending tags is increased by 1 at block 330.

As far as the display commands are concerned (blocks 333-372), a test is made at block 333 to determine the type of command entered by the developer. Accordingly, the blocks 336-360 are executed to condense the program, whereas the blocks 363-372 are executed to restore the visual representation of the program.

With reference to the condense commands (blocks 336-360), the method branches at block 336 according to a category that has been selected. Particularly, if the developer wishes to condense the functional instructions the block 339 is executed, if the developer wishes to condense the service instructions the blocks 340-342 are executed, whereas if the developer wishes to condense the comments the blocks 344-360 are executed.

Considering block 339 (functional instructions), the visual representation of the program (on the monitor of the computer) is updated hiding all the functional instructions; at the same time, the other statements are compacted accordingly.

Moving to block 340 (service instructions), all the program portions for the service instructions are collapsed into their starting tags (i.e., the program portions with the respective ending tags are hidden). The method then passes to block 341, wherein every service instruction is automatically disabled (for example, inserting the special symbol "//" at the beginning); in this way, the service instructions are excluded from any subsequent processing of the program (for example, when the program is compiled). Continuing to block 342, the boxes associated with the collapsed program portions are switched to the sign "+".

With reference now to block 344 (comments), the method verifies whether the developer wishes to condense the program portions for the comments at every level. The blocks 345-348 and the blocks 351-360 are executed in response to a positive result or to a negative result, respectively, of the test. In detail, if the developer has decided to condense all the comments the corresponding program portions are collapsed into their starting tags at block 345; continuing to block 348, the boxes associated with the collapsed program portions are switched to the sign "+". Conversely, if the developer has selected a threshold level for the comments the program portions having a level lower than the threshold level are collapsed at block 351. The boxes associated with the collapsed program portions are then switched to the sign "+" at block 354. Continuing to block 357, each collapsed program portion for the comments having a level equal to or greater than the threshold level (if any) is expanded; in other words, the program portion and the corresponding ending tag are shown again on the monitor (moving the other statements accordingly). Descending into block 360, the boxes associated with the expanded program portions are switched to the sign "−".

As far as the restore commands are concerned (blocks 363-372), the method branches at block 363 according to a further category that has been selected. The block 366 is executed for the functional instructions, the blocks 367-369 are executed for the service instructions and the blocks 370-372 are executed for the comments. In detail, if the developer wishes to restore the functional instructions all the corresponding statements are shown again on the monitor at block 366. On the other hand, if the developer wishes to restore the service instructions, all the corresponding program portions are expanded at block 367. The method then passes to block 368, wherein every service instruction is enabled again (deleting the special symbol "//" at the beginning). Descending into block 369, the boxes associated with the expanded program portions are switched to the sign "−". At the end, if the developer wishes to restore the comments, all the corresponding program portions are expanded at block 370. Descending into block 372, the boxes associated with the expanded program portions are switched to the sign "−".

Considering now the store commands (blocks 375-390), a test is made at block 375 to determine a desired format of the program. If the developer has decided to store the program in a complete format the block 378 is executed, if the developer has decided to store the program in a condensed format the blocks 381-384 are executed, whereas if the developer has decided to store the program in an ordered format the blocks 387-390 are executed.

Considering in particular block 378 (complete format), the program with all the statements is directly saved onto the hard-disk (irrespective of whether the program portions are displayed on the monitor or not). As far as the blocks 381-384 are concerned (condensed format), all the condensed portions (together with the respective starting and ending tags for the service instructions and the comments) are removed from the program at block 381. The condensed program so obtained is then copied at block 384 onto a file different from the one of the (complete) program; for example, the name of the file is obtained from the name of the file storing the complete program adding a prefix "C-". With reference now to blocks 387-390 (ordered format), all the program portions for the comments are grouped together and moved to the end of the program at block 387. The ordered program so obtained is then copied onto a further different file at block 393 (for example, adding the prefix "O-" to the name of the file storing the complete program).

Similar considerations apply if the editor performs an equivalent method or if additional functions are provided (for example, for compiling and running the program). However, the concepts of the present invention are also applicable when the starting and ending tags have a different format, when the boxes are replaced with equivalent graphical elements, or when the program (irrespective of its format) is always saved onto the same file (even on a mass memory different from the hard-disk). Alternatively, several categories are defined for the service instructions (for example, a category for the tracing instructions and a category for the performance instructions), the categories for the (functional and/or service) instructions are multilevel as well, or more generally a different number of categories and/or levels are supported.

Figure 4:
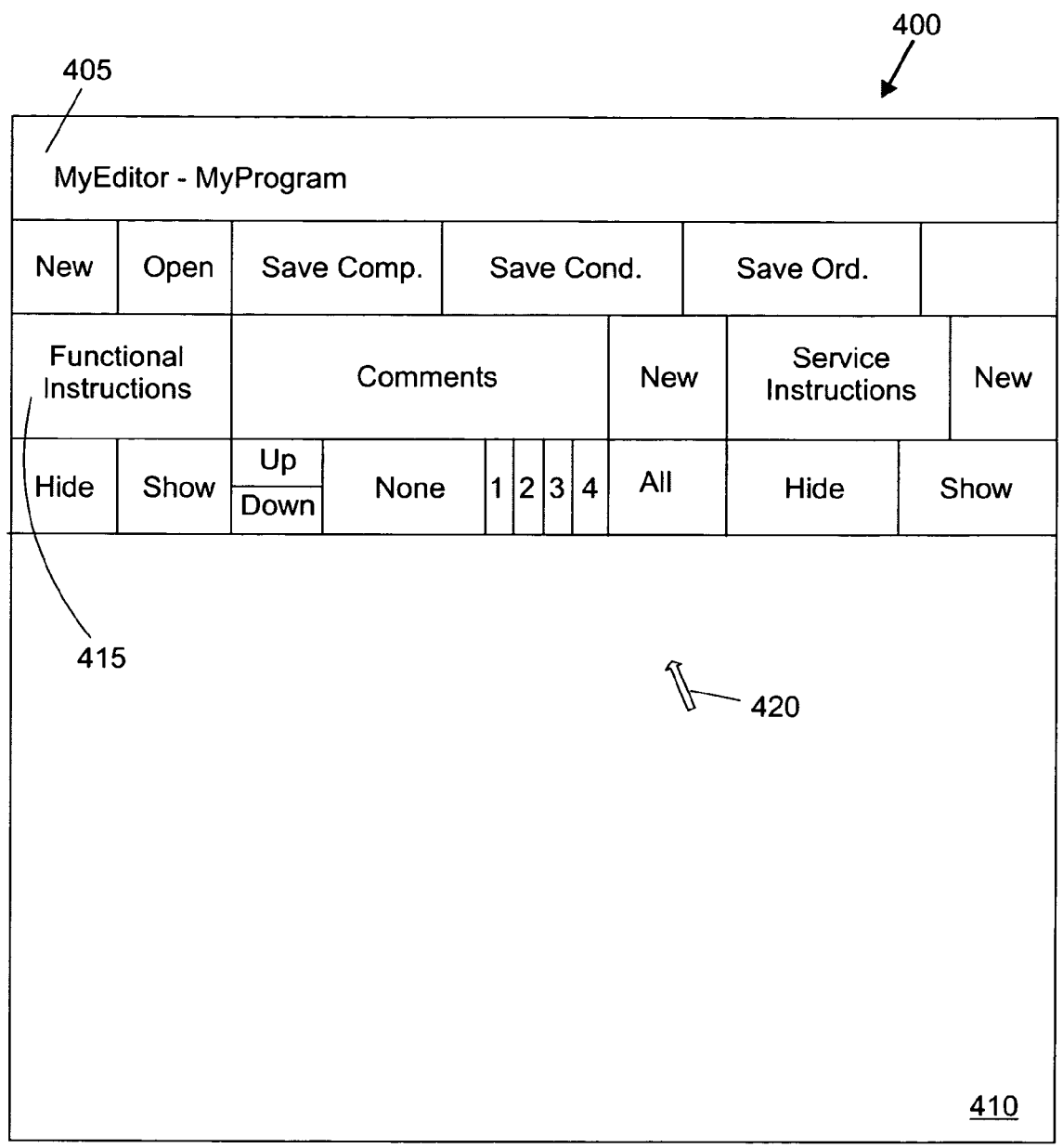
FIG. 4 depicts an example of a window running an editor that implements the method.

With reference now to FIG. 4, the editor runs in a window 400. A title bar 405 at the top of the window 400 contains the name of the editor ("MyEditor"), which is followed by the name of the program currently opened ("MyProgram"). A visual representation of the program (or a portion thereof) is displayed in an active frame 410. A menu bar 415 with a series of push buttons is displayed below the title bar 405.

In detail, the menu bar 415 includes push buttons for creating a new program (NEW), loading a pre-existing program (OPEN), saving the program in the complete format (SAVE COMP), in the condensed format (SAVE COND) or in the ordered format (SAVE ORD), respectively. The menu bar 415 also includes three different sections for the functional instructions, the comments and the service instructions. The section for the functional instructions includes a push button for hiding (HIDE) and a push button for showing again (SHOW), respectively, all the functional instructions. The section for the comments includes a push button for creating a new corresponding program portion (NEW); two push buttons (UP and DOWN) are used for raising and lowering, respectively, the level of a selected program portion. A push button (NONE) is used to collapse all the program portions for the comments, four push buttons (1, 2, 3 and 4) are used to select a desired threshold level for the program portions, and a push button (ALL) is used to expand all the program portions. At the end, the section for the service instructions includes a push button for creating a new corresponding program portion (NEW); two additional push buttons are used to hide (HIDE) and to show again (SHOW), respectively, all the service instructions. A current position in the window 400, to which the mouse points, is denoted with an arrow 420.

The sequence of operations involved by the editing of a generic program typically starts with the writing of its functional instructions. For this purpose, the developer points with the mouse to the active frame 410, and then starts typing the desired statements. For example, the program consists of two functional units, each one including a declaration and a command (DECLARATIONa, COMMANDa and DECLARATIONb, COMMANDb, respectively):

```
DECLARATIONa
COMMANDa
DECLARATIONb
COMMANDb
```

In order to add comments to the first functional unit, the developer points to its beginning in the active frame 410 with the mouse, and then clicks on the push button NEW for the category of the comments in the menu bar 415. In response thereto, a corresponding pair of starting ("//<C1>") and ending ("//<\C1>") tags is inserted before the first functional unit (with the box at the left of the starting tag that is filled with the sign "−"):

```
[−] //<C1>
    //<\C1>
    DECLARATIONa
    COMMANDa
    DECLARATIONb
    COMMANDb
```

The developer can then type a comment, consisting of a title of the first functional unit ("//TITLEa"), between those starting and ending tags:

```
[−] //<C1>
    //TITLEa
    //<\C1>
    DECLARATIONa
    COMMANDa
    DECLARATIONb
    COMMANDb
```

The push button NEW for the category of the comments is clicked again in the menu bar 415; a further corresponding pair of starting ("//<C1>") and ending ("//<\C1>") tags is likewise inserted at the current position in the active frame 410:

```
[−] //<C1>
    //TITLEa
    //<\C1>
[−] //<C1>
    //<\C1>
    DECLARATIONa
    COMMANDa
    DECLARATIONb
    COMMANDb
```

The developer now lowers the level of the new program portion by selecting the push button DOWN in the menu bar 415. In response thereto, the corresponding starting and ending tags are indented and updated accordingly ("//<C2>" and "//<\C2>"):

```
[−] //<C1>
    //TITLEa
    //<\C1>
[−] //<C2>
    //<\C2>
    DECLARATIONa
    COMMANDa
    DECLARATIONb
    COMMANDb
```

The developer can then type a comment, consisting of a description of the first functional unit ("//DESCRIPTIONa"), between those starting and ending tags:

```
[−] //<C1>
    //TITLEa
    //<\C1>
[−] //<C2>
    //DESCRIPTIONa
    //<\C2>
    DECLARATIONa
    COMMANDa
    DECLARATIONb
    COMMANDb
```

The same operations are repeated to add comments (consisting of a title "//TITLEb" and a description "//DESCRIPTIONb") to the second functional unit:

```
[−] //<C1>
    //TITLEa
    //<\C1>
[−] //<C2>
    //DESCRIPTIONa
    //<\C2>
    DECLARATIONa
    COMMANDa
[−] //<C1>
    //TITLEb
    //<\C1>
[−] //<C2>
    //DESCRIPTIONb
    //<\C2>
    DECLARATIONb
    COMMANDb
```

In order to insert tracing instructions, the developer points to the desired location in the active frame 410 with the mouse, and then clicks on the push button NEW for the category of the service instructions in the menu bar 415. In response thereto, a corresponding pair of starting ("//<S>") and ending ("//<\S>") tags is inserted in the active frame 410:

```
[−] //<C1>
    //TITLEa
    //<\C1>
[−] //<C2>
    //DESCRIPTIONa
    //<\C2>
    DECLARATIONa
[−] //<S>
    //<\S>
    COMMANDa
```

-continued

```
[−] //<C1>
     //TITLEb
     //<\C1>
     [−] //<C2>
         //DESCRIPTIONb
         //<\C2>
         DECLARATIONb
         COMMANDb
```

The developer can then type a tracing instruction for the first functional unit ("TRACINGa") between those starting and ending tags:

```
[−] //<C1>
     //TITLEa
     //<\C1>
     [−] //<C2>
         //DESCRIPTIONa
         //<\C2>
         DECLARATIONa
     [−] //<S>
         TRACINGa
         //<\S>
         COMMANDa
     [−] //<C1>
         //TITLEb
         //<\C1>
         [−] //<C2>
             //DESCRIPTIONb
             //<\C2>
             DECLARATIONb
             COMMANDb
```

The same operations are repeated to insert a tracing instruction ("TRACINGb") for the second functional unit:

```
[−] //<C1>
     //TITLEa
     //<\C1>
     [−] //<C2>
         //DESCRIPTIONa
         //<\C2>
         DECLARATIONa
     [−] //<S>
         TRACINGa
         //<\S>
         COMMANDa
     [−] //<C1>
         //TITLEb
         //<\C1>
         [−] //<C2>
             //DESCRIPTIONb
             //<\C2>
             DECLARATIONb
         [−] //<S>
             TRACINGb
             //<\S>
             COMMANDb
```

Let us assume now that the developer wishes to condense the service instructions. For this purpose, the corresponding push button HIDE in the menu bar 415 is selected. In response thereto, all the program portions for the service instructions are collapsed into the corresponding starting tags (with their boxes that are switched to the sign "+"):

```
[−] //<C1>
     //TITLEa
     //<\C1>
     [−] //<C2>
         //DESCRIPTIONa
         //<\C2>
         DECLARATIONa
     [+] //<S>
         COMMANDa
     [−] //<C1>
         //TITLEb
         //<\C1>
         [−] //<C2>
             //DESCRIPTIONb
             //<\C2>
             DECLARATIONb
         [+] //<S>
             COMMANDb
```

At the same time, every service instruction is disabled (in the example at issue, the service instructions "TRACINGa" and "TRACINGb" are converted into the comments "//TRACINGa" and "//TRACINGb", respectively). Therefore, those instructions do not interfere with the flow of the program any longer.

However, whenever the developer needs to execute a specific service instruction, that service instruction can be readily restored. For example, the developer clicks on the box at the left of the starting tag "//<S>" in the second functional unit. In response thereto, that program portion is expanded (restoring the service instructions and the ending tag) and the corresponding box is switched to the sign "−"; at the same time, every service instruction included in the expanded program portion is enabled again deleting the special symbol "//" at the beginning:

```
[−] //<C1>
     //TITLEa
     //<\C1>
     [−] //<C2>
         //DESCRIPTIONa
         //<\C2>
         DECLARATIONa
     [+] //<S>
         COMMANDa
     [−] //<C1>
         //TITLEb
         //<\C1>
         [−] //<C2>
             //DESCRIPTIONb
             //<\C2>
             DECLARATIONb
         [−] //<S>
             TRACINGb
             //<\S>
             COMMANDb
```

Let us assume now that the developer only wishes to see the comments of the program. For this purpose, the developer selects the push buttons HIDE for the functional instructions and for the service instructions in the menu bar 415. As a consequence, all the functional instructions are hidden and all the program portions for the service instructions are collapsed:

```
            [-]  //<C1>
                    //TITLEa
                    //<\C1>
                [-]  //<C2>
                        //DESCRIPTIONa
                        //<\C2>
                [+]  //<S>
                [-]  //<C1>
                        //TITLEb
                        //<\C1>
                    [-]  //<C2>
                            //DESCRIPTIONb
                            //<\C2>
                    [+]  //<S>
```

The comments can also be stored on the hard-disk simply selecting the push button SAVE COND in the menu bar 415. As a consequence, the functional and service instructions are removed from the program (together with all the starting and ending tags):

```
        //TITLEa
            //DESCRIPTIONa
        //TITLEb
            //DESCRIPTIONb
```

The compressed program is now copied onto a new file (for example, if the name of the file storing the complete program is "MyProgram" the new file will be "C-MyProgram"). This feature can be used to generate a development manual automatically (or it can help write any other documentation for the program).

Referring back to the program displayed on the monitor, if an overview of the comments is desired the developer can condense the corresponding program portions of low level. Particularly, the developer selects the push buttons 1 for the comments in the menu bar 415. In this way, the program portions for the comments having a level lower than 1 are collapsed:

```
            [-]  //<C1>
                    //TITLEa
                    //<\C1>
                    [+]  //<C2>
                [+]  //<S>
                [-]  //<C1>
                        //TITLEb
                        //<\C1>
                    [+]  //<C2>
                [+]  //<S>
```

In any case, the developer can see the comments of a desired functional unit simply expanding the corresponding program portion. For example, if all the comments relating to the second functional unit are desired, the developer clicks on the corresponding box (at the left of the starting comment "//<C2>"). In response thereto, that program portion is expanded (restoring the comments and the ending tag); the corresponding box is switched to the sign "−" at the same time:

```
            [-]  //<C1>
                    //TITLEa
                    //<\C1>
                [+]  //<C2>
                [-]  //<C1>
                        //TITLEb
                        //<\C1>
                    [-]  //<C2>
                            //DESCRIPTIONb
                            //<\C2>
```

As soon as the development of the program has been completed, all the service instructions can be automatically removed. For this purpose, the developer selects the push button SHOW for the functional instructions, the push button ALL for the comments, and the push button HIDE for the service instructions (in the menu bar 415). As a consequence, the functional instructions and the comments are restored, whereas the program portions for the service instructions are collapsed. If the developer now selects the push button SAVE COND in the menu bar 415, all the service instructions (together with their starting and ending tags) are removed from the program:

```
            [-]  //<C1>
                    //TITLEa
                    //<\C1>
                [-]  //<C2>
                        //DESCRIPTIONa
                        //<\C2>
                    DECLARATIONa
                    COMMANDa
                [-]  //<C1>
                        //TITLEb
                        //<\C1>
                    [-]  //<C2>
                            //DESCRIPTIONb
                            //<\C2>
                        DECLARATIONb
                        COMMANDb
```

The compressed program so obtained is now copied onto a new file (with the name "C-MyProgram").

Similar considerations apply if the editor runs in a different window, or if the commands are selected in another way; however, the concepts of the present invention are also applicable when a single command is available for restoring the whole program, or when the editor does not support any box for individually collapsing/expanding the program portions. Alternatively, the starting and ending tags are typed by the developer directly, or the level of each program portion is decreased automatically when the developer presses a tab key; moreover, the program portions can be collapsed into an equivalent marking element (for example, consisting of their first statement), or a visual cue (such as a dashed line) is used to denote the hidden functional instructions.

More generally, the present invention proposes a method of editing program code on a data processing system (with the program code that is suitable for subsequent processing). The method starts with the step of defining one or more portions of the program code. At least one of the defined portions is then selected. In the method of the invention, the selected portions are automatically disabled; in this way, the disabled portions are excluded from the subsequent processing.

The proposed solution facilitates the editing of the program code.

Indeed, in the method of the invention the developer can disable portions of the program code automatically.

As a consequence, any errors involved by the insertion and removal of portions of the program code is strongly reduced.

The preferred embodiment of the invention described above offers further advantages.

Particularly, the condensed portions can be automatically enabled again.

In this way, the continual insertion and removal of instructions during the development process becomes very fast and safe.

As a further enhancement, each portion of the program code is assigned to a category (with the portions of each category that are disabled or enabled at the same time).

The devised solution further facilitates the editing of the program code.

A suggested choice for partitioning the program code is to define one or more categories for service instructions.

This implementation covers the most common practical situations (and is a good compromise between flexibility and simplicity).

However, the method of the invention is also suitable to be implemented only disabling the instructions when they are not necessary, or with a different number or type of categories. Alternatively, the concept of categories is not supported, and the desired program portions can be disabled or enabled only individually or all together.

In a preferred embodiment, the program portions are disabled converting them into comments (and are enabled restoring the corresponding instructions).

In this way, the disabled portions remain available in their original position.

A suggested choice for defining the program portions is to enclose them between a pair of predefined comments.

The proposed solution has a minimal impact on the structure of the program.

As a further improvement, each portion is condensed on the monitor when disabled and it is restored when enabled again.

Therefore, the developer can reduce the complexity of the program code when displayed, thereby increasing its readability.

Preferably, the method of the invention supports the possibility of removing each condensed portion from the program.

This feature allows storing condensed versions of the program automatically (for example, for documentation purposes); moreover, the proposed solution allows reducing the space occupied by the program (for example, removing the service instructions when they are not necessary any longer).

However, the solution of the invention is also suitable to be implemented disabling the program portions in a different way (for example, adding the start comment symbol at the beginning and the end comment symbol at the end), or defining the program portions with another technique (for example, using tags that are not visible to the developer). Alternatively, the editor does not support the possibility of condensing the disabled portions, or the possibility of removing the condensed portions from the program.

Vice versa, the feature of condensing and restoring the visual representation of the program portions is suitable to be used (alone or in combination with the other additional features) even without the possibility of automatically disabling the program portions.

Advantageously, the solution according to the present invention is implemented with a computer program, which is provided as a corresponding product stored on a suitable medium.

Alternatively, the program is pre-loaded onto the harddisk, is sent to the computer through a network, is broadcast, or more generally is provided in any other form directly loadable into the working memory of the computer. However, the method according to the present invention leads itself to be carried out with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. A method of editing program code on a data processing system, the program code being suitable for subsequent processing, wherein the method includes the steps of:
    defining at least two portions of the program code;
    selecting a first defined portion of the at least two portions of the program code, wherein the first defined portion is a service instruction portion;
    compressing a representation of the first defined portion in a visual representation of the program code such that content of the first defined portion is not visible in the visual representation of the program code, wherein a second defined portion of the at least two portions of the program code remains visible in the visual representation of the program code;
    automatically disabling the first defined portion, the disabled first defined portion being excluded from the subsequent processing, wherein the second defined portion is subjected to subsequent processing, wherein disabling the first defined portion comprises automatically converting the service instructions in the first defined portion to comments in the program code by inserting comment tags in association with the service instructions;
    receiving an input to re-enable the first defined portion; and
    automatically re-enabling the first defined portion in response to receiving the input, wherein re-enabling the first defined portion comprises removing the comment tags associated with the service instructions.

2. The method according to claim 1, further comprising:
    assigning each defined portion to a category of a set including at least one category, wherein the step of selecting the first defined portion comprising selecting at least one category.

3. The method according to claim 2, wherein the set includes at least one category for service instructions.

4. The method according to claim 1, wherein the step of defining the at least two portions of the program code includes:
    enclosing each portion between a starting comment and an ending comment.

5. The method according to claim 1, further including the steps of:
    updating the program code by removing the first defined portion, and
    storing the updated program code.

6. The method of claim 1, wherein compressing the representation of the first defined portion in the visual representation of the program code comprises:

replacing a visual representation of the content of the first defined portion with an identifier of the first defined portion, the identifier indicating a position in the program code where the first defined portion was present but not containing contents of the first defined portion; and inserting, into the visual representation of the program code, an compression identifier in association with the identifier of the first defined portion, the compression identifier indicating that the first defined portion has been compressed.

7. The method of claim 6, wherein the compression identifier is user selectable, and wherein, in response to a user input selecting the compression identifier, the contents of the first defined portion are expanded in the visual representation of the program code and are re-enabled.

8. The method of claim 1, wherein at least one of the at least two portions of the program code has an associated level, and wherein selecting a first defined portion of the at least two portions of the program code comprises receiving an input specifying a level such that portions of program code equal to or above the specified level are visually represented in the visual representation of the program code, and wherein portions of the program code that are not equal to or above the specified level are automatically compressed in the visual representation of the program code such that they are not visible.

9. The method of claim 8, wherein the first defined portion and second defined portion are both of a same content type but have different associated levels.

10. The method of claim 1, wherein only portions of the program code that are visible in the visual representation of the program code are stored in a compressed version of the program code.

11. A method of editing program code on a data processing system, the program code being suitable for subsequent processing, wherein the method includes the steps of:

defining at least two portions of the program code;

selecting a first defined portion of the at least two portions of the program code;

compressing a representation of the first defined portion in a visual representation of the program code such that content of the first defined portion is not visible in the visual representation of the program code, wherein a second defined portion of the at least two portions of the program code remains visible in the visual representation of the program code; and automatically disabling the first defined portion, the disabled first defined portion being excluded from the subsequent processing, wherein the second defined portion is subjected to subsequent processing, wherein the first defined portion of the program code is a comment in the program code, the method further comprising:

moving the first defined portion from its original position in the program code to a predetermined position within the program code to thereby generate re-organized program code; and storing the re-organized program code.

* * * * *